US008875023B2

(12) United States Patent
Cronin et al.

(10) Patent No.: US 8,875,023 B2
(45) Date of Patent: Oct. 28, 2014

(54) THUMBNAIL NAVIGATION BAR FOR VIDEO

(75) Inventors: Dennis G. Cronin, Redmond, WA (US); Ronald A. Morris, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1299 days.

(21) Appl. No.: 11/964,738

(22) Filed: Dec. 27, 2007

(65) Prior Publication Data

US 2009/0172543 A1 Jul. 2, 2009

(51) Int. Cl.
| | |
|---|---|
| *G06F 3/00* | (2006.01) |
| *G06F 3/0484* | (2013.01) |
| *G06F 3/0485* | (2013.01) |

(52) U.S. Cl.
CPC .......... *G06F 3/04847* (2013.01); *G06F 3/0485* (2013.01); *G06F 3/0484* (2013.01)
USPC ............................. 715/723; 715/716; 715/722

(58) Field of Classification Search
USPC .......................... 715/723, 704, 716, 722, 851
See application file for complete search history.

(56) References Cited

U.S. PATENT DOCUMENTS

| | | | |
|---|---|---|---|
| 5,694,176 A | 12/1997 | Bruette et al. | |
| 6,275,989 B1 | 8/2001 | Broadwin et al. | |
| 6,388,715 B1 | 5/2002 | Eggen et al. | |
| 6,405,371 B1 | 6/2002 | Oosterhout et al. | |
| 6,567,980 B1 * | 5/2003 | Jain et al. | 725/61 |
| 6,833,848 B1 * | 12/2004 | Wolff et al. | 715/719 |
| 2002/0028026 A1 * | 3/2002 | Chen et al. | 382/284 |
| 2002/0075572 A1 | 6/2002 | Boreczky et al. | |
| 2002/0091739 A1 * | 7/2002 | Ferlitsch et al. | 707/526 |
| 2003/0026594 A1 * | 2/2003 | Shiiyama | 386/69 |
| 2003/0090504 A1 * | 5/2003 | Brook et al. | 345/716 |
| 2003/0106057 A1 | 6/2003 | Perdon | |
| 2005/0097606 A1 | 5/2005 | Scott et al. | |
| 2005/0160113 A1 | 7/2005 | Sipusic et al. | |
| 2006/0218588 A1 | 9/2006 | Kelts | |
| 2007/0044010 A1 * | 2/2007 | Sull et al. | 715/500.1 |
| 2007/0198111 A1 | 8/2007 | Oetzel et al. | |
| 2008/0168364 A1 * | 7/2008 | Miller et al. | 715/762 |
| 2008/0256450 A1 * | 10/2008 | Takakura et al. | 715/721 |
| 2011/0047574 A1 * | 2/2011 | Tecot et al. | 725/41 |
| 2011/0107369 A1 * | 5/2011 | O'Brien et al. | 725/38 |
| 2012/0233648 A1 * | 9/2012 | Raman et al. | 725/93 |
| 2013/0007620 A1 * | 1/2013 | Barsook et al. | 715/719 |

OTHER PUBLICATIONS

Li, et al., "Browsing Digital Video", Proceedings of the SIGCHI conference on Human factors in computing systems., ACM 2000, pp. 8.
"Developing Programs for Digital Television", pp. 1-8.
"Frameline.tv", Versatile Delivery Systems Ltd., 2007, pp. 1-4.

* cited by examiner

*Primary Examiner* — William Bashore
*Assistant Examiner* — Gregory A Distefano
(74) *Attorney, Agent, or Firm* — Micah Goldsmith; Micky Minhas; Wolfe-SBMC

(57) ABSTRACT

While playing back video on a display device, a user request to display a navigation bar corresponding to the video is received. In response to receiving the user request, the navigation bar is displayed on the display device. This navigation bar includes multiple thumbnails each corresponding to a different location in the video. A user selection of one of the multiple thumbnails is received, and playing of the video is changed to begin playing at a location corresponding to the selected thumbnail.

20 Claims, 7 Drawing Sheets

THUMBNAIL NAVIGATION BAR FOR VIDEO

BACKGROUND

Many different kinds of video that consumers can watch today allow the user to rewind or fast forward through the video at different speeds. Such techniques allow a user to go forwards or backwards through the video quickly, but oftentimes make it difficult for the consumer to find the exact location he or she is looking for. For example, in a television program recorded on a digital video recorder, a consumer may try to fast forward over a commercial but go past the point where the program playback resumes. So, the consumer either misses part of the program, or has to rewind the video to find the location where the commercial ends and the program begins. These current rewind and fast forward techniques can thus be problematic and can create frustrating user experiences.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the thumbnail navigation bar for video, video is played back on a display device. While playing the video, a user requests to display a navigation bar corresponding to the video being played. In response to receiving the user request, the navigation bar is displayed on the display device. This navigation bar includes multiple thumbnails each corresponding to a different location in the video. A user selection of one of the multiple thumbnails is received, and playing of the video is changed to begin playing at a location corresponding to the selected thumbnail.

In accordance with one or more aspects of the thumbnail navigation bar for video, video content is accessed. Multiple thumbnails corresponding to the video content are generated by generating, for each of multiple locations of the video content, a thumbnail of the video content that is displayed at the location. The multiple thumbnails are made available as the thumbnails of a navigation bar to be displayed on a display device in response to a user request to display the navigation bar received while the video content is being played on the display device.

BRIEF DESCRIPTION OF THE DRAWINGS

The same numbers are used throughout the drawings to reference like features.

DETAILED DESCRIPTION

A thumbnail navigation bar for video is discussed herein. Video is played back to a user on a display and, in response to a user request, a navigation bar is also displayed. The navigation bar includes a series of thumbnails corresponding to the video. The user is able to scroll through the thumbnails in the navigation bar, moving forwards and/or backwards through the thumbnails. The user can select any of the thumbnails in the navigation bar and have playback of the video begin at a point corresponding to the selected thumbnail.

Figure 1:
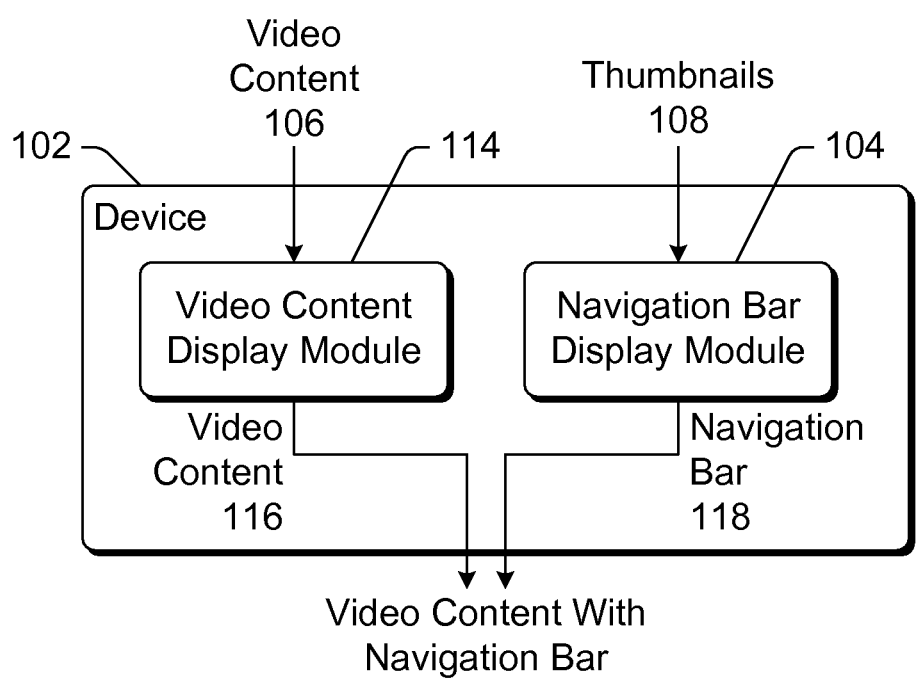
FIG. 1 illustrates an example system implementing the thumbnail navigation bar for video in accordance with one or more embodiments.

FIG. 1 illustrates an example system 100 implementing the thumbnail navigation bar for video in accordance with one or more embodiments. System 100 includes a device 102 including a navigation bar display module 104 and a video content display module 114. Device 102 can be any of a variety of devices that generate video for display. For example, device 102 can be a computer, such as a desktop computer, a mobile station, an entertainment appliance, a set-top box communicatively coupled to a display device, video playback devices (e.g., digital video recorder (DVR), digital versatile disk (DVD) player, etc.), a wireless phone, a game console, an automotive PC, and so forth. Thus, device 102 can range from full resource devices with substantial memory and processor resources (e.g., personal computers, game consoles, etc.) to a low-resource device with limited memory and/or processing resources (e.g., traditional set-top boxes, hand-held game consoles, DVD players, etc.). Although modules 104 and 114 are illustrated as being part of the same device, alternatively modules 104 and 114 can be implemented by different devices.

Video content display module 114 receives video content 106, converts video content 106 into a format that can be displayed by a display device, and outputs the converted video content as video content 116. Video content display module 114 also optionally extracts particular content from video content 106, such as tuning to a particular channel, selecting a particular stream, and so forth. Navigation bar display module 104 optionally receives a series of thumbnails 108 corresponding to video content 106 and video content 116. Other types of content corresponding to video content 106, such as audio content, are also oftentimes received by device 102. Thumbnails 108 can be received from a same or different source as video content 106, or alternatively can be generated by device 102.

Video content 106 and thumbnails 108 can be received from any of a variety of different sources. These sources can be local sources, such as a hard disk or DVD that is inserted into, coupled to, or included as part of device 102. These sources can also be remote sources, such as one or more remote servers, one or more broadcast centers or other content distributors, or other devices making content 106 and/or thumbnails 108 available to device 102. Remote sources can make content 106 and/or thumbnails 108 available via any of a variety of transmission media, such as one or more of the Internet, a wide area network (WAN), a local area network (LAN), a wireless network, a telephone network, an intranet, a terrestrial analog or digital signal, a cable system, a satellite system, and so forth.

Video content 106 and thumbnails 108 can be received as part of the same communication streams. For example, content 106 can be broadcast to device 102 and thumbnails 108 can be included in a vertical blanking interval (VBI) of content 106. By way of another example, content 106 can be streamed to device 102 as multiple packets, and packets containing thumbnails 108 can be interspersed with the packets containing content 106. Alternatively, video content 106 and thumbnails 108 can be received as part of different communication streams. For example, content 106 and thumbnails 108 can be received as two different data packet streams from two different servers. By way of another example, content 106 and thumbnails 108 can be received as two different digital television channels. Additionally, individual thumbnails can be received from individual data streams.

In one or more embodiments, device 102 displays video content 116. In other embodiments device 102 generates a video signal based on video content 116 that is output to one or more other devices which in turn display video content 116. Device 102 also typically plays back other content associated with video content 116, such as audio content, or generates a signal based on this other content that is output to one or more other devices to play back or otherwise present the content.

Navigation bar display module 104 generates a navigation bar 118 associated with video content 116. As video content 116 is video content 106 in a different format, navigation bar 118 is also associated with video content 106. One or both of video content 116 and navigation bar 118 are displayed by device 102. Alternatively a video signal based on one or both of video content 116 and navigation bar 118 is output to one or more other devices which in turn display one or both of navigation bar 118 and video content 116.

Navigation bar 118 generated by module 104 includes thumbnails 108. Each thumbnail 108 in the navigation bar corresponds to a particular portion of video content 116. Video content 116 has an associated timeline, with different portions of video content having different temporal offsets into the video content. For example, one portion may be 15 minutes, 20 seconds into the video content so it has a temporal offset of 15 minutes, 20 seconds, while another portion may be 8 minutes, 40 seconds into the video content so it has a temporal offset of 8 minutes, 40 seconds, and so forth.

The thumbnails are arranged in a particular sequence based on the timeline of video content 116. Each thumbnail corresponds to a particular portion of video content 116, so thumbnails corresponding to earlier portions (smaller temporal offsets) of video content 116 are situated in the sequence before thumbnails corresponding to later portions (larger temporal offsets) of video content 116. For example, if a first thumbnail corresponds to a portion 12 minutes into video content 106, and a second thumbnail corresponds to a portion 14 minutes into video content 106, then the first thumbnail is situated in the thumbnail sequence before the second thumbnail.

The thumbnails are displayed in the navigation bar in order of their appearance in the thumbnail sequence. There are typically more thumbnails in the sequence than can be displayed at any given time, so only a subset of the thumbnails in the sequence are displayed in the navigation bar at any given time. The user is able to scroll forwards and backwards through the thumbnails in the navigation bar, resulting in different subsets of the thumbnails being displayed in the navigation bar as the user scrolls.

Scrolling forwards through the thumbnails or through the navigation bar refers to moving forward in the thumbnail sequence so that thumbnails later in the sequence (corresponding to later portions of video content 116) are displayed in the navigation bar. Similarly, scrolling backwards through the thumbnails or through the navigation bar refers to moving backward in the thumbnail sequence so that thumbnails earlier in the sequence (corresponding to earlier portions of video content 116) are displayed in the navigation bar. It should be noted that, while the thumbnails are being scrolled through, the playing of video content 116 continues. The playing of video content 116 does not change until one of the thumbnails is selected, as discussed in more detail below. Alternatively, playing of video content 116 can be paused while the navigation bar is displayed.

Figure 2:
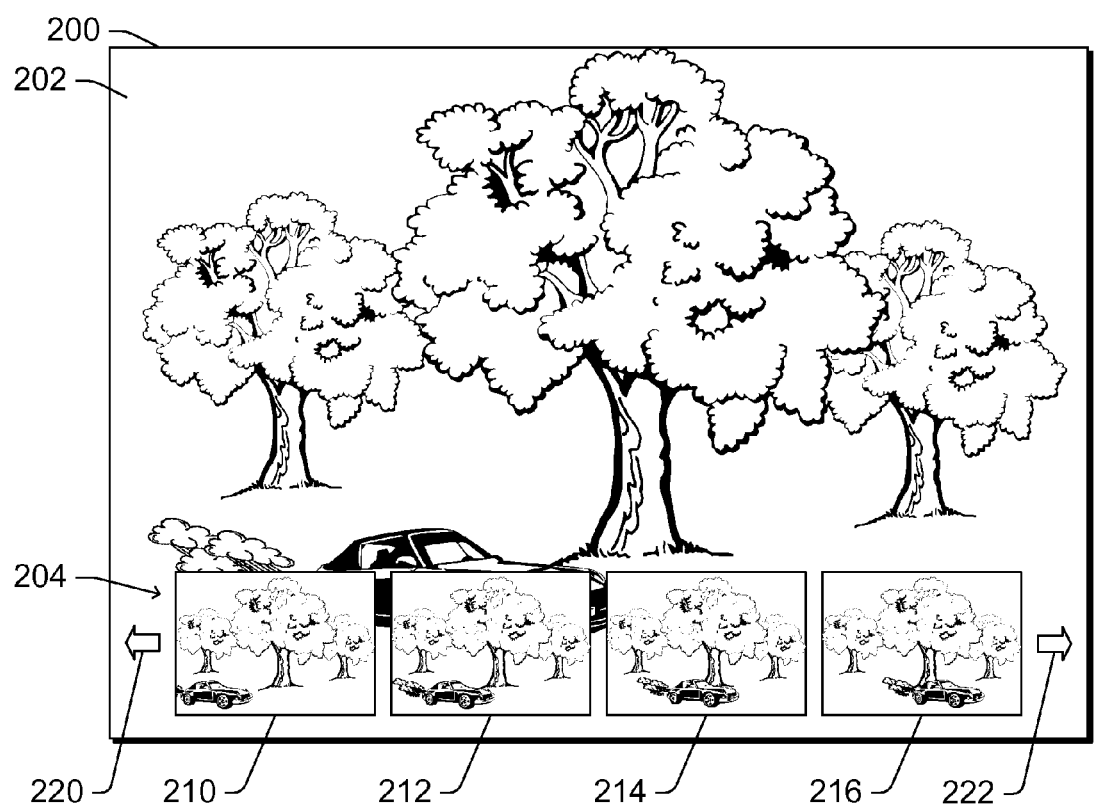
FIG. 2 illustrates an example display of video content and a corresponding navigation bar in accordance with one or more embodiments.

FIG. 2 illustrates an example display of video content and a corresponding navigation bar in accordance with one or more embodiments. A display 200 includes a full-screen or full-window portion 202 in which video content is displayed. This video content is, for example, video content 116 of FIG. 1 as output by display device 102. Display 200 also includes a navigation bar 204 that includes multiple thumbnails 210, 212, 214, and 216. These thumbnails 210-216 are, for example, thumbnails 108 of FIG. 1. Although only four thumbnails are illustrated in navigation bar 204, it is to be appreciated that additional thumbnails are associated with the video content being displayed in portion 202.

Navigation bar 204 is displayed in response to receiving a user request to display navigation bar 204. This user request can be input in any of a variety of different manners. In one or more embodiments, a remote control device is associated with display 200. This remote control device includes a button, such as a navigation button, which can be activated (e.g., pressed) by the user to request that navigation bar 204 be displayed. Alternatively, the user request can be input in other manners, such as by activation of a button of the device including display 200, activation of a button on a set-top box, uttering a voice or other audible command, selection of an on-screen button (e.g., using a pointer and a cursor control device), and so forth.

In one or more embodiments, navigation bar 204 is displayed while playback of the video content in portion 202 continues. Playback of other content, such as audio content, corresponding to the video content is also typically played back while navigation bar 204 is displayed. Although navigation bar 204 is displayed in response to a user request to display navigation bar 204, this display does not stop playback of the video content in portion 202. Thus, the user is able to continue viewing the video content in portion 202 while using navigation bar 204.

Navigation bar 204 is illustrated as having four thumbnails 210-216. It is to be appreciated that this is only an example, and that navigation bar 204 can alternatively have more or fewer than four thumbnails. Navigation bar 204 is also illustrated as including a left arrow 220 and a right arrow 222. Left arrow 220 indicates that there are additional thumbnails preceding thumbnail 210, and right arrow 222 indicates that there are additional thumbnails following thumbnail 216. Alternatively, navigation bar 204 may not include arrows 220 and 222.

Each thumbnail 210-216 corresponds to a particular location of video content being displayed in portion 202. These locations refer to temporal locations in the video content. These temporal locations can be fixed, such as locations at fixed temporal intervals from one another in the video content (e.g., every 20 seconds, every minute, etc.). These temporal locations can also vary based on the particular video content. For example, different thumbnails can correspond to different temporal locations according to scene changes within the video content. By way of another example, the video content can include program content (e.g., television program, movie, news broadcast, etc.) as well as commercial content, and different thumbnails can correspond to the beginning of commercial content, the ending of commercial content, the resumption of program content after a commercial break (after playing the commercial content, and so forth). Different thumbnails can also correspond to other specified locations (e.g., as specified by an author or publisher viewing the video content, by another remote user generating a set of thumbnails, and so forth).

The user is able to scroll forwards and backwards through the thumbnails in navigation bar 204, allowing the user to view different thumbnails corresponding to different locations in the video content being displayed in portion 202. The user is also able to select a particular thumbnail in the navigation bar and cause playback of the video content being displayed in portion 202 to jump to the location corresponding to the selected thumbnail.

The user can scroll forwards and backwards through thumbnails in navigation bar 204 in different manners. In one or more embodiments, a remote control device associated with display 200 includes a reverse button and a forward button (e.g., a left arrow button and a right arrow button) that the user can activate to scroll backwards and forwards, respectively, through the thumbnails. Alternatively, the user can scroll through the thumbnails of navigation bar 204 in other manners, such as by activation of buttons on the device including display 200, activation of buttons on a set-top box, input of verbal commands, selection of on-screen buttons (e.g., using a pointer and a cursor control device) such as arrows 220 and 222, and so forth.

A particular thumbnail in navigation bar 204 can be selected by the user in different manners. In one or more embodiments, a particular thumbnail is highlighted or otherwise distinguished from the other thumbnails being displayed in bar 204. The user can scroll through the thumbnails of navigation bar 204 causing different thumbnails to be highlighted or otherwise distinguished. The highlighted or otherwise distinguished thumbnail is then selected by the user inputting a "play" or "jump to" command. This "play" or "jump to" command can be input in different manners, such as activation of a particular button on a remote control device associated with display 200, activation of a button on the device including display 200, activation of a button on a set-top box, input of a verbal command, selection of an on-screen button (e.g., using a pointer and a cursor control device), and so forth.

Navigation bar 204 thus provides a user interface that allows a user to quickly and easily rewind and/or fast forward through video content. The user can rewind and/or fast forward through the video content by scrolling through the thumbnails of the navigation bar to select the particular location he or she would like to jump to, and then selecting a thumbnail corresponding to that particular location. Playback of the video content then begins at the location corresponding to the selected thumbnail. Using navigation bar 204, the user is able to move swiftly through the thumbnails corresponding to the video content and is oftentimes less likely to overshoot a particular location or thumbnail he or she is looking for.

Figure 3:
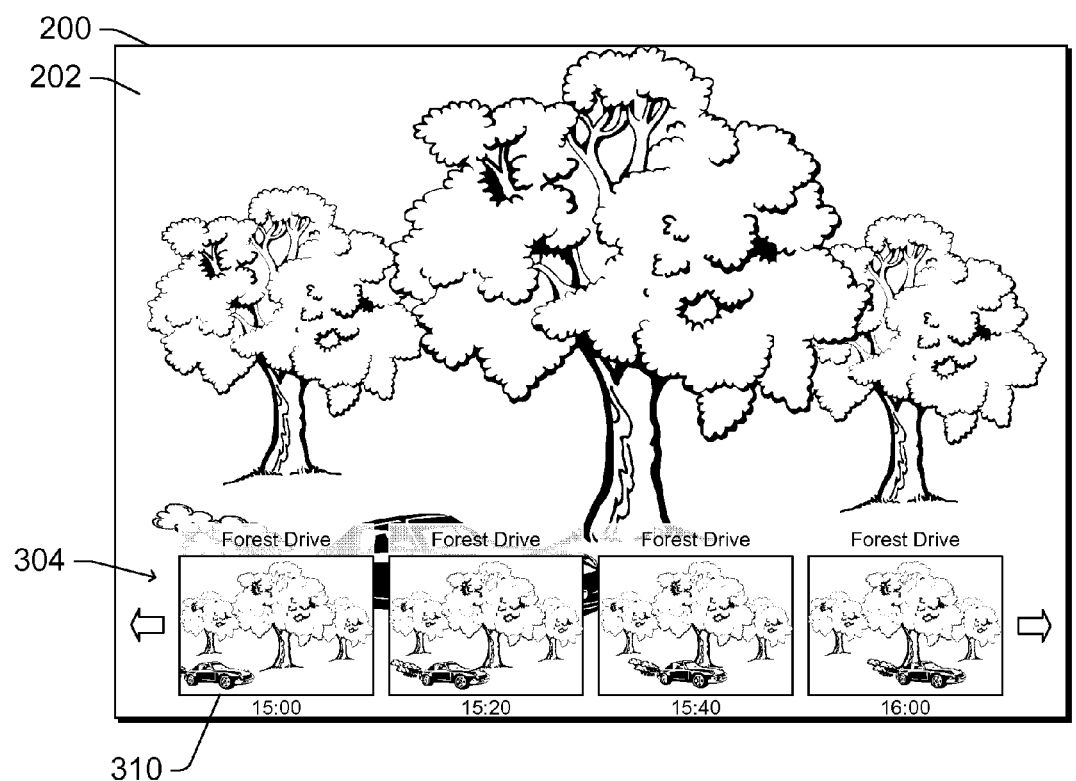
FIG. 3 illustrates another example display of video content and a corresponding navigation bar in accordance with one or more embodiments.

FIG. 2 illustrates an example of a navigation bar. It is to be appreciated, however, that FIG. 2 is only an example and that navigation bars can be displayed in different manners. FIG. 3 illustrates another example display of video content and a corresponding navigation bar in accordance with one or more embodiments. A display 200 includes a full-screen or full-window portion 202 in which video content is displayed, analogous to the display in FIG. 2.

However, in FIG. 3 a navigation bar 304 is illustrated including both captions above the thumbnails and timecodes below the thumbnails. For example, in navigation bar 304 a caption of "Forest Drive" is displayed above thumbnail 310, and a timecode of "15:00" is displayed below thumbnail 310. The caption for each thumbnail is a text description of the location of the video content corresponding to that thumbnail. The timecode is a description of the location of the video content corresponding to the thumbnail. For example, "15: 00" would indicate that the location of the video content is 15 minutes into the video content, while "15:20" would indicate that the location of the video content is 15 minutes, 20 seconds into the video content.

In the examples of FIGS. 2 and 3, the navigation bar is displayed as overlaying portion 202. Alternatively, the navigation bar could be displayed in another location of display 200. For example, the navigation bar can be located adjacent to (e.g., above or below) portion 202. Additionally, in the examples of FIGS. 2 and 3 the navigation bar is displayed as being opaque—the underlying video content in portion 202 cannot be seen through the thumbnails of the navigation bar (although the captions for the thumbnails in FIG. 3 are displayed as being transparent). Alternatively, the navigation bar could be transparent, allowing the underlying video content in portion 202 to be partially seen through the thumbnails of the navigation bar. This transparency can be achieved in any of a variety of conventional manners, such as by combining, for each pixel or display location in a thumbnail, the pixel or display location values of the underlying video content and the corresponding pixel or display location values of the thumbnail. For example, the pixel or display location values could be weighted (e.g., 15% of the underlying video content's value, and 85% of the thumbnail's value) and added together to generate a pixel or display location value for each pixel or display location in the thumbnail.

Additionally, in the examples of FIGS. 2 and 3, the navigation bar is displayed as being a horizontal bar. Alternatively, the navigation bar could be displayed in other directions, such as a vertical bar overlaying or adjacent to the left or right sides of portion 202.

Furthermore, it is to be appreciated that the sizes of the navigation bars illustrated in FIGS. 2 and 3 are only examples, and that navigation bars of different sizes can be used. The navigation bar, including the thumbnails in the navigation bar, can be larger or smaller than is shown in FIGS. 2 and 3.

Returning to FIG. 1, in different embodiments navigation bar display module 104 can incorporate various features into the navigation bar. These features incorporate different presentation techniques to assist the user in scrolling through thumbnails and locating particular thumbnails. Examples of these different presentation techniques are discussed below, although it is to be appreciated that these are only examples and that any of a variety of other techniques can also be employed.

Different presentation techniques can employ different content types in thumbnails. In one or more embodiments the thumbnails are still images, although alternatively other content types could be used. For example, thumbnails could be video content, could be text content, could be drawings or other graphics, could include audio content, and so forth. Additionally, when the thumbnails are still images, the still images are typically obtained from the corresponding video content (e.g., snapshots or a particular frame(s) of the video content). Alternatively, the still images could be obtained from other sources rather than from the video content.

Different presentation techniques can also be used to display different thumbnails in different manners. In one or more embodiments, the video content is segmented into multiple different pieces, and different pieces can be displayed in different manners. Video content can be separated into different pieces in any of a variety of different manners. For example, the video content can include program content as one piece(s) (e.g., television program, movie, news broadcast, etc.) as well as commercial content as another piece(s). The thumbnails corresponding to the program content can be displayed with one appearance and the thumbnails corresponding to the commercial content can be displayed with another appearance. By way of another example, the video content could be a movie with different scenes of the movie being different pieces of the video content, a play with different acts of the play being different pieces of the video content, a baseball game with different innings or different players at bat being different pieces of the video content, and so forth.

The different appearances for thumbnails corresponding to different pieces of video content can take any of a variety of different forms. For example, different appearances can be different borders around the thumbnails (e.g., different colors, different designs, different animations, etc.), different sizes of thumbnails, different color shading for thumbnails (e.g., some thumbnails can be shaded red, others green, etc.), different brightness or intensities for thumbnails, and so forth.

In addition, the thumbnails in the navigation bar can be scrolled through both forwards and backwards as discussed above. How quickly the subset or group of thumbnails that are displayed is changed as the user scrolls through the thumbnails is referred to as the speed of scrolling. A particular amount of time between changes, which is an amount of time one subset of thumbnails is displayed before being changed to a different subset of thumbnails, can be defined. For example, in response to the user pressing a forward or rewind button, the thumbnails being displayed can change every 0.25 seconds, every 0.10 seconds, and so forth.

Different presentation techniques can change this speed resulting in increasing the speed (and thus reducing the amount of time between a change in display of thumbnails), and/or decreasing the speed (and thus increasing the amount of time between a change in display of thumbnails). For example, the speed can increase the longer the forward or rewind button is held down. By way of another example, the speed can decrease the closer the thumbnails being displayed are to a thumbnail corresponding to the current location of the video content being displayed (e.g., to a current playback time of the video) or to a thumbnail corresponding to the video content that has not been played back yet. By way of another example, the speed can decrease the closer the thumbnails being displayed are to a thumbnail(s) corresponding to a particular piece of the video content (e.g., to a commercial, to a new scene, and so forth).

Additionally, different presentation techniques can be used to display thumbnails differently based on whether the video content locations corresponding to the thumbnails have already been played back. A current playback time of the video content can be identified, the current playback time being a temporal offset into the video content for the video content currently being played back. The manner in which a particular thumbnail is presented can vary based on whether the thumbnail corresponds to a temporal offset that is before or after the current playback time. This different presentation could be a shadowing or graying-out of thumbnails that correspond to locations of the video content that have not already been played back. Alternatively, any of a variety of different changes in appearance could be used as discussed above. These different presentations would allow a user to, for example, easily distinguish whether the thumbnails he or she is scrolling through correspond to portions of the video content that have or have not been played back yet.

By way of example, assume that particular video content is being played back (e.g., in portion 202 of FIG. 2 or 3) and that the location currently being played back is 18 minutes, 10 seconds into the video content. When the navigation bar is displayed, any thumbnails corresponding to locations of the video content before this temporal offset (e.g., 18 minutes, 10 seconds into the video content or earlier) are displayed normally (e.g., no shadowing or graying-out of the thumbnail). Additionally, any thumbnails corresponding to locations of the video content after this temporal offset (e.g. later than 18 minutes, 10 seconds into the video content) are displayed shadowed or grayed-out.

Furthermore, in one or more embodiments any of a variety of different presentation features are user-configurable settings. The user is able to set options identifying what different appearances are to be used and/or what different pieces of the video content are to have corresponding thumbnails displayed differently. For example, the user could select whether thumbnails corresponding to video content that has not yet been played back are to be displayed grayed-out. By way of another example, the user could select whether thumbnails corresponding to commercial content are to be displayed differently than thumbnails corresponding to program content.

Additionally, in one or more embodiments thumbnails corresponding to particular pieces of the video content are not displayed in the navigation bar. Whether to display thumbnails corresponding to particular pieces of the video content can optionally be a user-configurable setting. For example, rather than shadowing or graying-out thumbnails corresponding to locations of the video content that have not yet been displayed, thumbnails corresponding to locations of the video content that have not yet been displayed are not displayed in the navigation bar.

Figure 4:
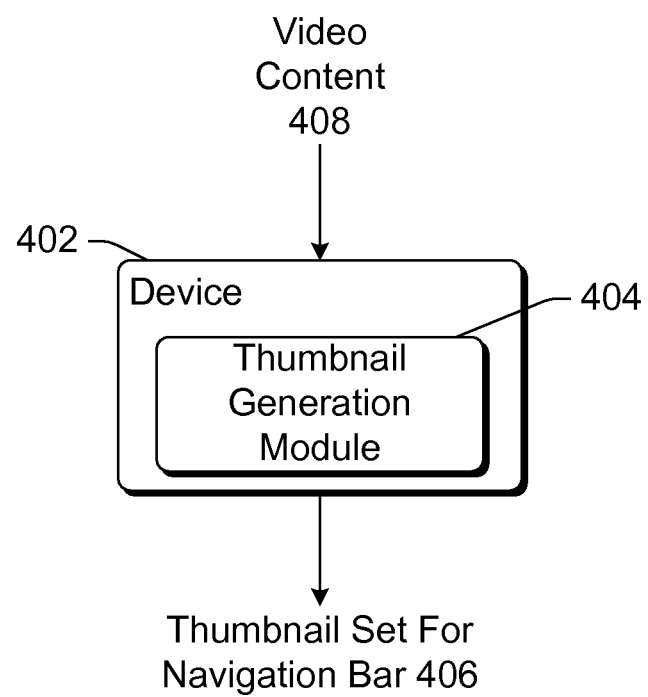
FIG. 4 illustrates an example system generating thumbnails for the thumbnail navigation bar for video in accordance with one or more embodiments.

FIG. 4 illustrates an example system 400 generating thumbnails for the thumbnail navigation bar for video in accordance with one or more embodiments. System 400 includes a device 402 including a thumbnail generation module 404 that generates a set of thumbnails 406 for video content 408. Device 402 can be any of a variety of devices that generate thumbnails. For example, device 402 can be a computer, such as a desktop computer, a mobile station, an entertainment appliance, a set-top box communicatively coupled to a display device, video playback devices (e.g., digital video recorder (DVR), digital versatile disk (DVD) player, etc.), a wireless phone, a game console, an automotive PC, and so forth. Thus, device 402 can range from full resource devices with substantial memory and processor resources (e.g., personal computers, game consoles, etc.) to a low-resource device with limited memory and/or processing resources (e.g., traditional set-top boxes, hand-held game consoles, DVD players, etc.).

In one or more embodiments, device 402 is device 102 of FIG. 1. In such embodiments, thumbnail generation module 404, navigation bar display module 104 of FIG. 1, and video content display module 114 of FIG. 1 are included in the same device. In such embodiments the thumbnails are generated and displayed by the same device. Thus, in such embodiments thumbnails 108 of FIG. 1 are not always received for video content 106 because they can be generated by the device 102. Alternatively, device 402 can be a separate device, in which case the thumbnails are provided to device 102 of FIG. 1 as thumbnails 108.

Thumbnail generation module 404 generates thumbnails 406 for a navigation bar corresponding to video content 408.

Thumbnail generation module 404 can generate thumbnails in any of a variety of different manners. As discussed above, different thumbnails can correspond to locations at fixed temporal intervals in the video content. In one or more embodiments, thumbnail generation module 404 generates a thumbnail from the video content at these fixed intervals, such as every 20 seconds, every minute, and so forth.

Alternatively, thumbnail generation module 404 can generate thumbnails in other manners, such as by generating a thumbnail at every scene change (e.g., different scenes or acts in a movie or play, different innings for a baseball game, different possessions or downs for a football game, the start of a commercial, when a program resumes after a commercial break, and so forth). In one or more embodiments, such scene changes are automatically identified using any of a variety of well-known scene detection processes or algorithms.

Additionally, thumbnails can be generated for specific locations of the video content that are identified by a user of device 402. For example, the distributor or author of the video content, or other user, can identify the locations of the video content that are to have corresponding thumbnails generated.

It should be noted that situations can arise where multiple different sets of thumbnails are available for particular video content. For example, the author of the video content can generate one set of thumbnails, while fans or other users of the video content can generate one or more other sets of thumbnails. In such situations, one or more of the sets of thumbnails can be a default set, and a user can optionally select one of the multiple sets if he or she desires to use a set other than the default set.

Additionally, it should be noted that device 402 can generate thumbnails 406 using multiple ones of the techniques discussed above. For example, device 402 can generate thumbnails at both fixed intervals and scene changes. The same thumbnail generation module 404 can generate thumbnails using these different techniques, or alternatively different modules 404 can be included in device 402.

The generation of a thumbnail from a particular location of video content can be performed in any of a variety of manners. The specific manner in which a particular thumbnail is generated varies based on the content type of the thumbnail. For example, still images can be captured as single frames of the video content. This can optionally be a combination of multiple frames of the video content depending on the manner in which the video content is compressed and/or stored. By way of another example, if the thumbnail includes video content the video content for the thumbnail can be copied from the corresponding video content. Alternatively, the video content can be an indication of which portion of the corresponding video content is to be included in the thumbnail (e.g., rather than generating a data structure including video content for the thumbnail, the data structure can include an indication of which frames of the video content are to be played back in the thumbnail). By way of yet another example, the thumbnail content can be obtained from another source (e.g., as identified by a user of device 402).

The generation of a set of thumbnails 406 includes generating a data structure for each thumbnail. This data structure typically includes the actual content of the thumbnail (e.g., the data for a still image), although the data structure can alternatively include a reference to where the content of the thumbnail can be obtained (e.g., a particular portion of the video content as discussed above, a remote source, another file on a device playing back the video content, etc.). In one or more embodiments, this data structure also includes one or both of a caption for the thumbnail to be displayed when the thumbnail is displayed in the navigation bar, and a timecode identifying the location of the video content corresponding to the thumbnail that is to be displayed when the thumbnail is displayed in the navigation bar.

Additional information corresponding to the thumbnails can also be included in thumbnail set 406. Any information that can be used by a device in displaying and/or using the navigation bar can be included in thumbnail set 406. For example, thumbnail set 406 can include information identifying which thumbnail(s) correspond to commercial content, which thumbnail(s) correspond to program content, which thumbnail(s) correspond to which scene(s), and so forth.

Figure 5:
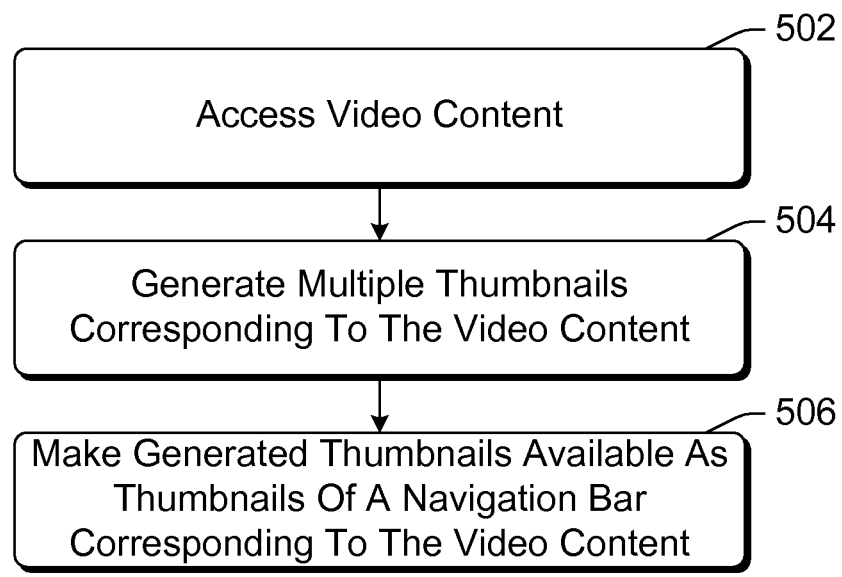
FIG. 5 is a flowchart illustrating an example process for generating thumbnails for a navigation bar.

FIG. 5 is a flowchart illustrating an example process 500 for generating thumbnails for a navigation bar. Process 500 can be implemented in software, firmware, hardware, or combinations thereof. Process 500 can be carried out, for example, by thumbnail generation module 404 of FIG. 4.

Initially, video content for which thumbnails are to be generated is accessed (act 502). The video content can be obtained from any of a variety of different sources, including local and/or remote sources, analogous to the discussion of video content 106 of FIG. 1. Multiple thumbnails corresponding to the video content are then generated (act 504). These multiple thumbnails can be generated in any of a variety of manners and corresponding to any of a variety of different portions of the video content as discussed above.

The generated thumbnails are then made available as thumbnails of a navigation bar corresponding to the accessed video content (act 506). The thumbnails can be made available in any of a wide variety of manners that allow the thumbnails to be accessed when the video content is accessed so that the navigation bar can be displayed. In one or more embodiments, a thumbnail file is generated to store the thumbnails and is sent to any device that obtains the corresponding video content. Alternatively, the thumbnails can be included in a same file as the corresponding video content (e.g., as meta data corresponding to the video content). In other alternatives, the thumbnails are generated and stored locally (e.g., in a local storage device of a DVR or a DVD player). Additionally, other information that can be used by a device in displaying and/or using the navigation bar can be made available with the thumbnails in act 506.

Figure 6:
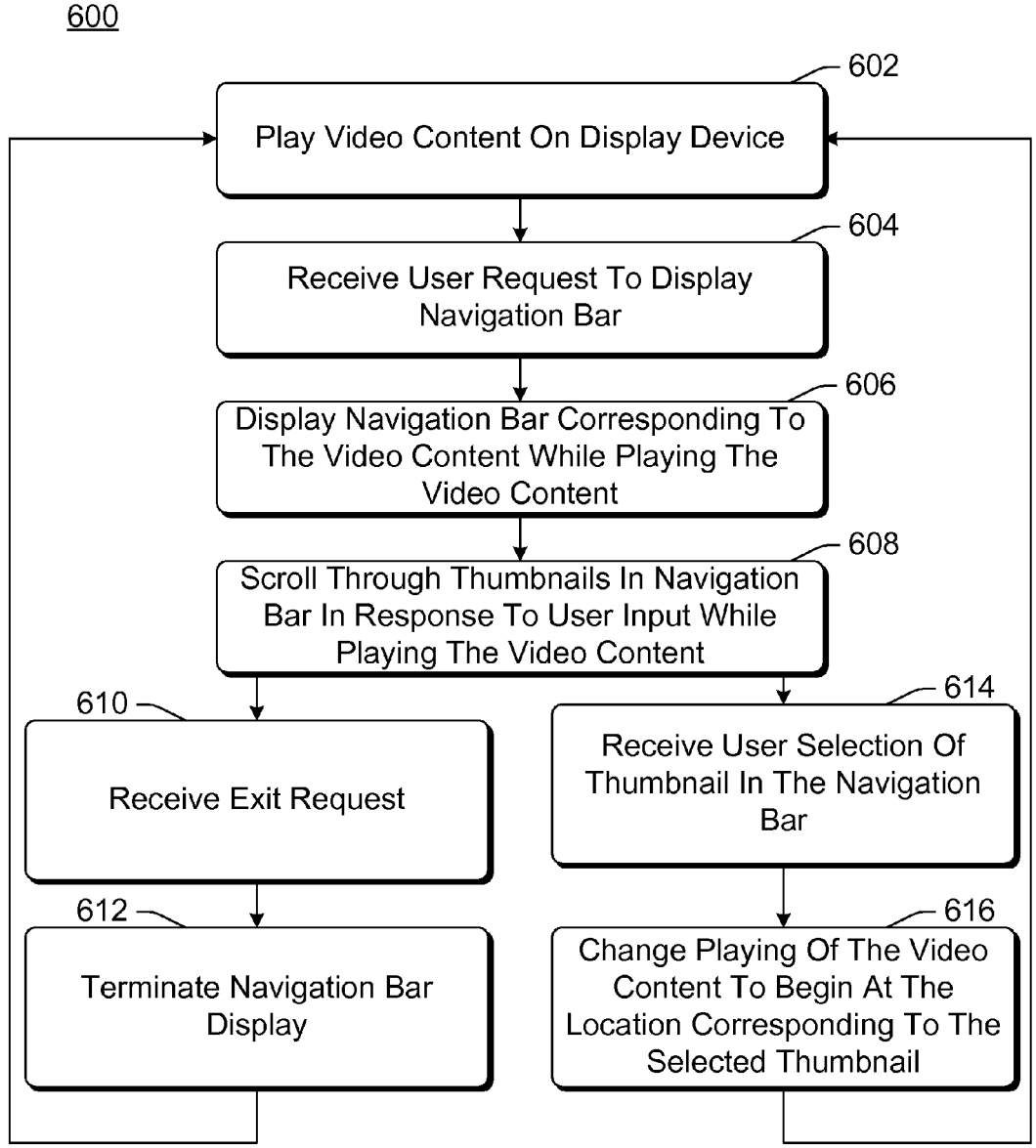
FIG. 6 is a flowchart illustrating an example process using the thumbnail navigation bar for video.

FIG. 6 is a flowchart illustrating an example process 600 for rewinding and/or fast forwarding through video using the thumbnail navigation bar for video. Process 600 can be implemented in software, firmware, hardware, or combinations thereof. Process 600 can be carried out, for example, by a device such as display device 102 of FIG. 1.

Initially, video content is played back on a display device (act 602). The video content can be played back in response to a user request or alternatively in response to another event or request (e.g., loading of a DVD, selection of a program in an electronic programming guide, and so forth). A user request to display a navigation bar is received (act 604). This user request can be received in any of a variety of different manners as discussed above, such as by activation of a navigation button on a remote control device.

In response to the user request, a navigation bar corresponding to the video content played in act 602 is displayed while the video content is still playing (act 606). The display of the thumbnails is then scrolled through in response to user input while playing the video content (act 608). As discussed above, this scrolling can be forwards and/or backwards through the thumbnails.

Process 600 then proceeds based on whether an exit request is received or a thumbnail from the navigation bar is selected. In one or more embodiments, an exit request is received (act 610). The exit request can take any of a variety of different forms, such as the user selecting or otherwise activating an exit button (on a remote control device, on a set-top box, on the display device, etc.), by user inactivity for at least a threshold amount of time (e.g., at least the threshold amount of time passes without the user scrolling through the thumbnails in any direction), and so forth. In response to receiving the exit request, display of the navigation bar is terminated (act 612), and playback of the video continues (act 602).

Alternatively, a user selection of one of the thumbnails in the navigation bar can be received (act 614). This user selection can be made in any of a variety of manners as discussed above. In response to the user selection of a particular thumbnail, playback of the video content is changed to begin at the location corresponding to the selected thumbnail (616). In other words, playback of the video content jumps to the location of the video content corresponding to the selected thumbnail. Playback of the video then continues (act 602) at this location corresponding to the selected thumbnail.

Figure 7:
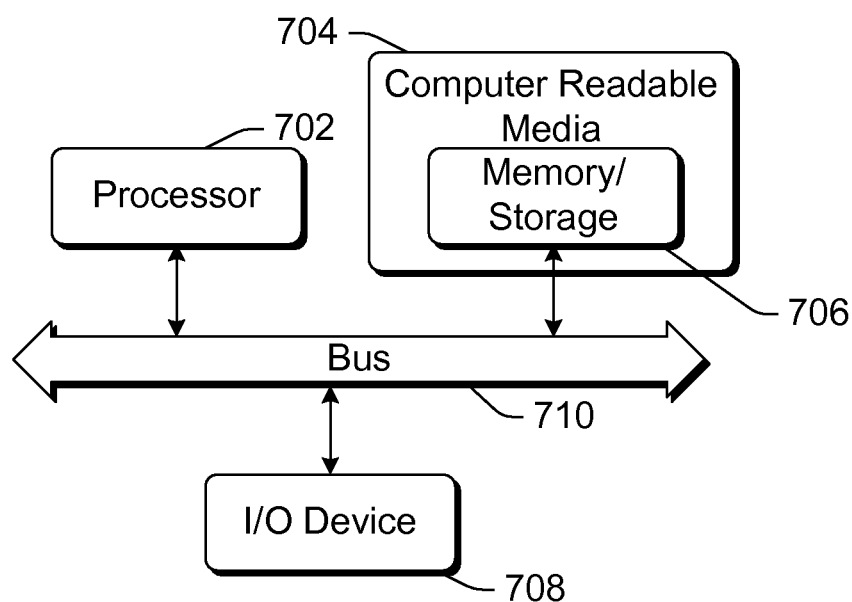
FIG. 7 illustrates an example computing device that can be configured to implement the thumbnail navigation bar for video in accordance with one or more embodiments.

FIG. 7 illustrates an example computing device 700 that can be configured to implement the thumbnail navigation bar for video in accordance with one or more embodiments. Computing device 700 can be, for example, device 102 of FIG. 1 or device 402 of FIG. 4. Computing device 700 can implement any of the techniques and processes discussed herein.

Computing device 700 includes one or more processors or processing units 702, one or more computer readable media 704 which can include one or more memory and/or storage components 706, one or more input/output (I/O) devices 708, and a bus 710 that allows the various components and devices to communicate with one another. Computer readable media 704 and/or I/O device(s) 708 can be included as part of, or alternatively may be coupled to, computing device 700. Bus 710 represents one or more of any of several types of bus structures, including a memory bus or memory controller, a peripheral bus, an accelerated graphics port, and a processor or local bus using any of a variety of bus architectures. Bus 710 can include wired and/or wireless buses.

Memory/storage component 706 represents one or more computer storage media. Component 706 can include volatile media (such as random access memory (RAM)) and/or nonvolatile media (such as read only memory (ROM), Flash memory, optical disks, magnetic disks, and so forth). Component 706 can include fixed media (e.g., RAM, ROM, a fixed hard drive, etc.) as well as removable media (e.g., a Flash memory drive, a removable hard drive, an optical disk, and so forth).

The techniques and processes discussed herein can be implemented in software, with instructions being executed by processing unit 702. It is to be appreciated that different instructions can be stored in different components of computing device 700, such as in processing unit 702, in various cache memories of processing unit 702, in other cache memories of device 700 (not shown), on other computer readable media, and so forth. Additionally, it is to be appreciated that the location where instructions are stored in computing device 700 can change over time.

One or more input/output devices 708 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques and processes may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Additionally, it should be noted that in one or more embodiments the techniques and processes discussed herein can be implemented in hardware. For example, one or more logic circuits, application-specific integrated circuits (ASICs), programmable logic devices (PLDs), and so forth can be created and/or configured to implement the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   causing a video to be played on a display device;
   receiving, while the video is being played, a user request to display a navigation bar corresponding to the video;
   displaying, in response to receiving the user request, the navigation bar on the display device, the navigation bar including multiple thumbnails each corresponding to one of multiple scene changes in the video;
   in response to a single user input, automatically and without further direct user input, performing operations including:
      scrolling, while the video is being played, through display of different ones of the multiple thumbnails by at least changing the display of the different ones of the multiple thumbnails at a predefined speed, the predefined speed including an amount of time between changes of the display of the different ones of the multiple thumbnails; and altering the predefined speed of the scrolling based at least in part on how close a subset of the multiple thumbnails being displayed are in time to a thumbnail corresponding to a current playback time of the video, the altering the speed including decreasing the speed of the scrolling the closer the subset of the multiple thumbnails being displayed are in time to the thumbnail corresponding to the current playback time of the video;

receiving a user selection of one of the multiple thumbnails; and causing the video to begin playing at a location corresponding to the selected thumbnail.

2. A method as recited in claim 1, the displaying the navigation bar comprising overlaying the navigation bar on at least a portion of the video while displaying the video.

3. A method as recited in claim 1, the receiving the user request comprising receiving the user request in response to user activation of a navigation button on a remote control device.

4. A method as recited in claim 3, further comprising:
receiving an indication of user activation of a forward button on the remote control device;
in response to the indication of user activation of the forward button, scrolling forwards through the multiple thumbnails in the navigation bar;
receiving an indication of user activation of a reverse button on the remote control device; and
in response to the indication of user activation of the reverse button, scrolling backwards through the multiple thumbnails in the navigation bar.

5. A method as recited in claim 1, the video including both commercial content and program content, the method further comprising:
scrolling through displaying the multiple thumbnails in response to user input; and
altering a speed of the scrolling based at least in part on whether a current subset of the multiple thumbnails being displayed correspond to the commercial content or to the program content.

6. A method as recited in claim 1, the displaying the navigation bar further comprising displaying, for each of the multiple thumbnails, both:
a time code identifying a playback time of the video that corresponds to the thumbnail; and
a caption describing the thumbnail.

7. A method as recited in claim 1, the video including both commercial content and program content, the method further comprising:
displaying, with a first appearance, thumbnails of the multiple thumbnails that correspond to the commercial content; and
displaying, with a second appearance, thumbnails of the multiple thumbnails that correspond to the program content.

8. A method as recited in claim 1, wherein the altering the speed further includes increasing the speed of the scrolling the further the subset of the multiple thumbnails being displayed are in time to the thumbnail corresponding to the current playback time of the video.

9. A method comprising:
accessing video content;
generating multiple thumbnails corresponding to the video content by generating, for each of multiple locations corresponding to scene changes in the video content, a thumbnail of the video content that is displayed at the location; and
making the multiple thumbnails available as the thumbnails of a navigation bar to be displayed on a display device in response to a user request to display the navigation bar received while the video content is being played on the display device;
responsive to a single user input, automatically and without further direct user input, performing operations including:
scrolling, while the video content is being played, through display of different ones of the multiple thumbnails; and
altering a speed of the scrolling based at least in part on how close a subset of the multiple thumbnails being displayed are in time to a thumbnail corresponding to a current playback time of the video content, the altering the speed including increasing the speed of the scrolling the further the subset of the multiple thumbnails being displayed are in time to the thumbnail corresponding to the current playback time of the video.

10. A method as recited in claim 9, each of the multiple thumbnails comprising a still image.

11. A method as recited in claim 9, the video content including both commercial content and program content, the generating comprising generating a first thumbnail corresponding to a location of the video content where the commercial content begins, and generating a second thumbnail corresponding to a location of the video content where the program content resumes after the commercial content.

12. A method as recited in claim 9, wherein the altering the speed further includes decreasing the speed of the scrolling the closer the subset of the multiple thumbnails being displayed are in time to the thumbnail corresponding to the current playback time of the video.

13. One or more computer storage media having stored thereon multiple instructions that, when executed by one or more processors, allow a user to rewind and/or fast forward through video content by causing the one or more processors to:
receive, while video content is being played, a user request to display a navigation bar corresponding to the video content;
display, while the video content is being played, the navigation bar in response to receiving the user request, the navigation bar including multiple thumbnails corresponding to different scene changes in the video content;
responsive to a single user input, automatically and without further direct user input:
scroll, while the video content is being played, through display of different ones of the multiple thumbnails; and
alter a speed of the scrolling based at least in part on how close a subset of the multiple thumbnails being displayed are in time to a thumbnail corresponding to a current playback time of the video content, the speed being altered by decreasing the speed of the scrolling the closer the subset of the multiple thumbnails being displayed are in time to the thumbnail corresponding to the current playback time of the video; and
jump to a beginning of a scene corresponding to a selected thumbnail and cause the video content to be played beginning at the location.

14. One or more computer storage media as recited in claim 13, wherein to receive the user request is to receive the user request in response to user activation of a navigation button on a remote control device.

15. One or more computer storage media as recited in claim 13, the video content including both commercial content and program content, the instructions further causing the one or more processors to alter how quickly different ones of the multiple thumbnails are displayed while scrolling based at least in part on whether a current set of the multiple thumbnails being displayed correspond to the commercial content or to the program content.

16. One or more computer storage media as recited in claim 13, the video content including both commercial content and program content, wherein to display the navigation bar is to:
  display, with a first appearance, thumbnails of the multiple thumbnails that correspond to the commercial content; and
  display, with a second appearance, thumbnails of the multiple thumbnails that correspond to the program content.

17. One or more computer storage media as recited in claim 13, wherein the altering the speed further includes increasing the speed of the scrolling the further the subset of the multiple thumbnails being displayed are in time to the thumbnail corresponding to the current playback time of the video.

18. One or more computer storage media as recited in claim 13, wherein the instructions, when executed by the one or more processors, cause the one or more processors further to:
  display, for each of the multiple thumbnails, a time code identifying a playback time of the video content that corresponds to the thumbnail; and
  a caption describing the thumbnail.

19. One or more computer storage media as recited in claim 13, wherein the video content includes both commercial content and program content, wherein the instructions, when executed by the one or more processors, cause the one or more processors further to:
  display, with a first appearance, thumbnails of the multiple thumbnails that correspond to the commercial content; and
  display, with a second appearance, thumbnails of the multiple thumbnails that correspond to the program content.

20. One or more computer storage media as recited in claim 13, wherein the navigation bar includes an overlay on at least a portion of the video content while the video is played.

* * * * *